Feb. 12, 1957 M. D. RUST 2,780,902
DRIVE MEANS FOR COTTON PICKING SPINDLES
Original Filed March 21, 1950 3 Sheets-Sheet 1
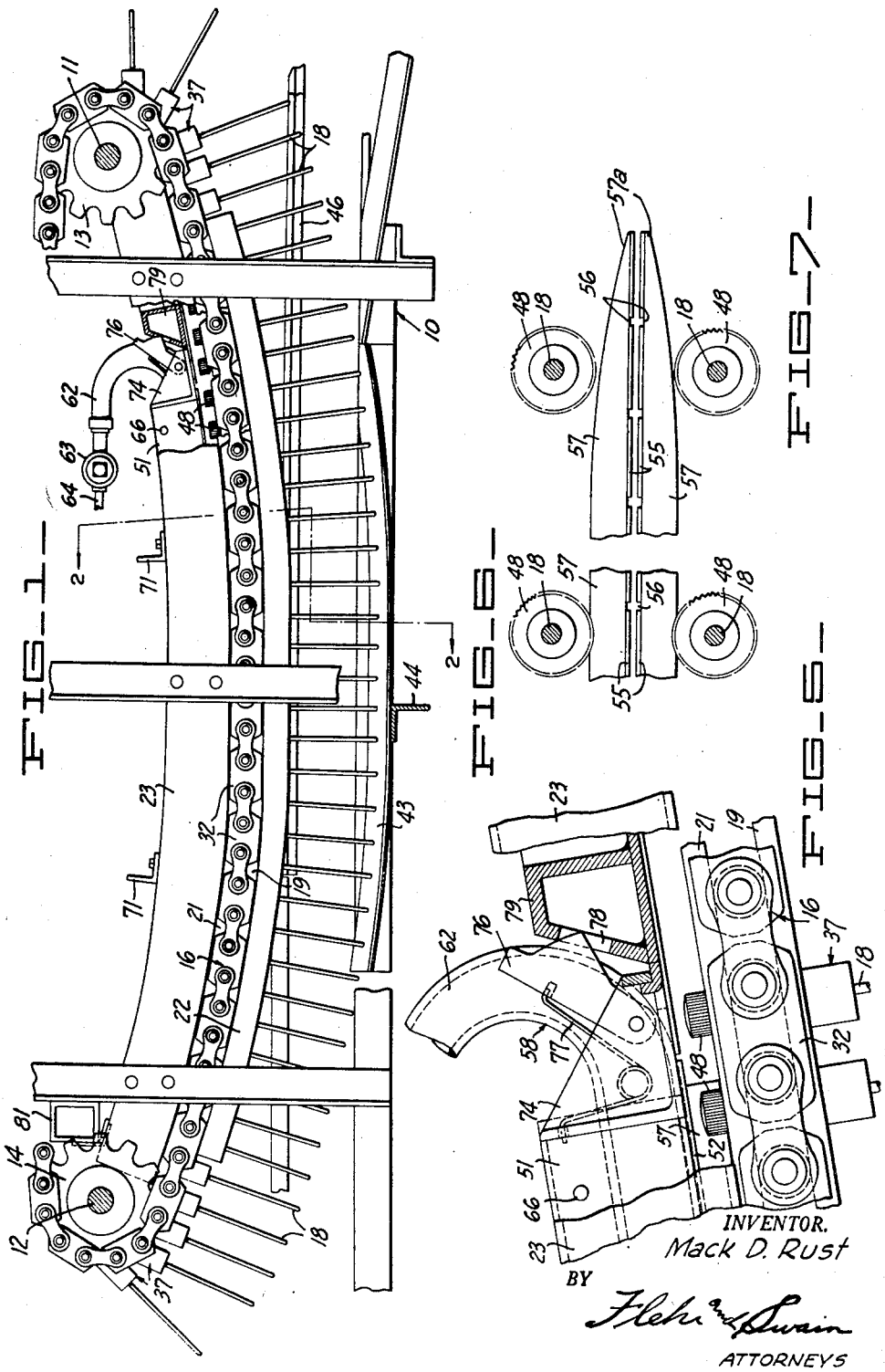
INVENTOR.
Mack D. Rust
BY
ATTORNEYS

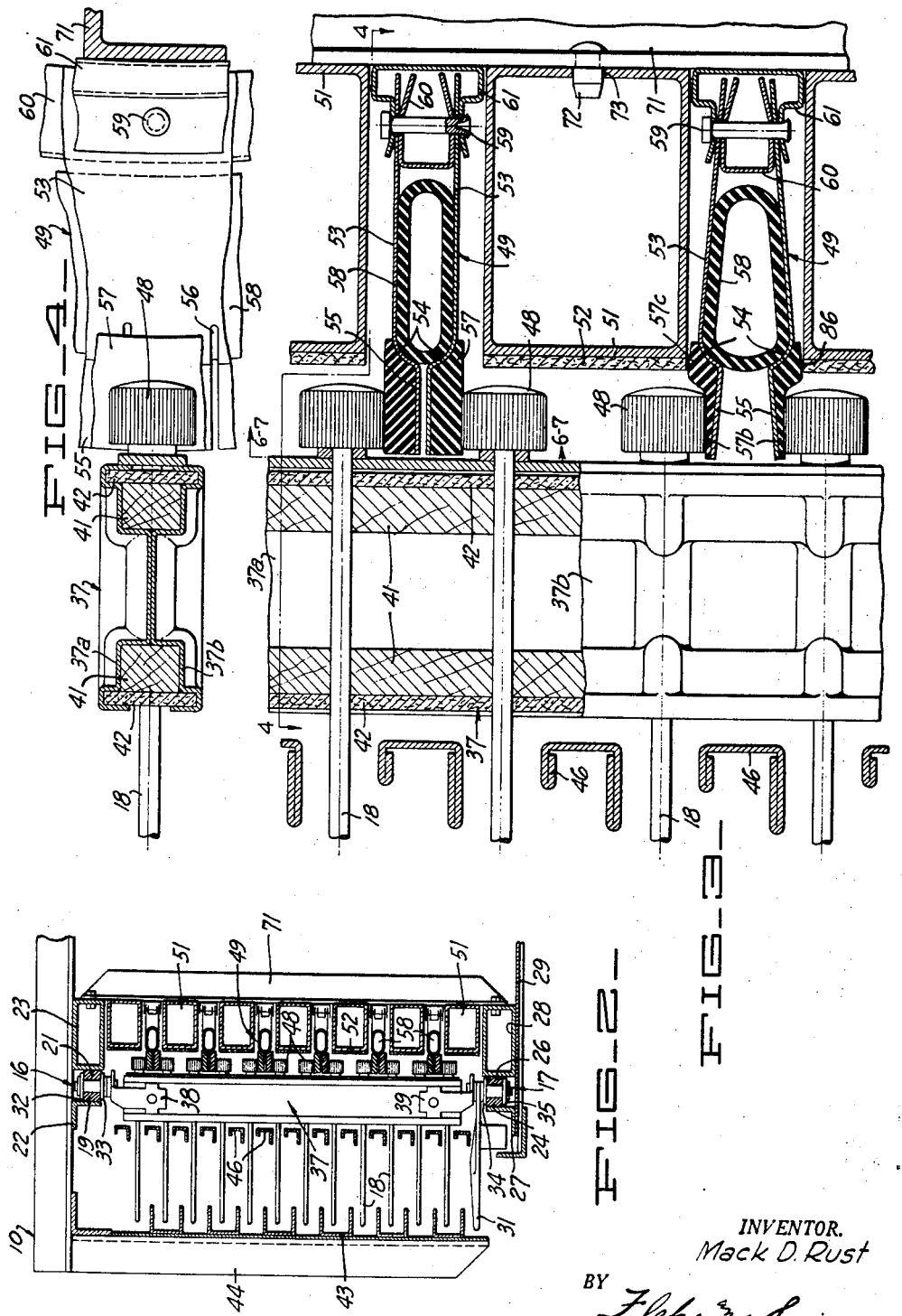

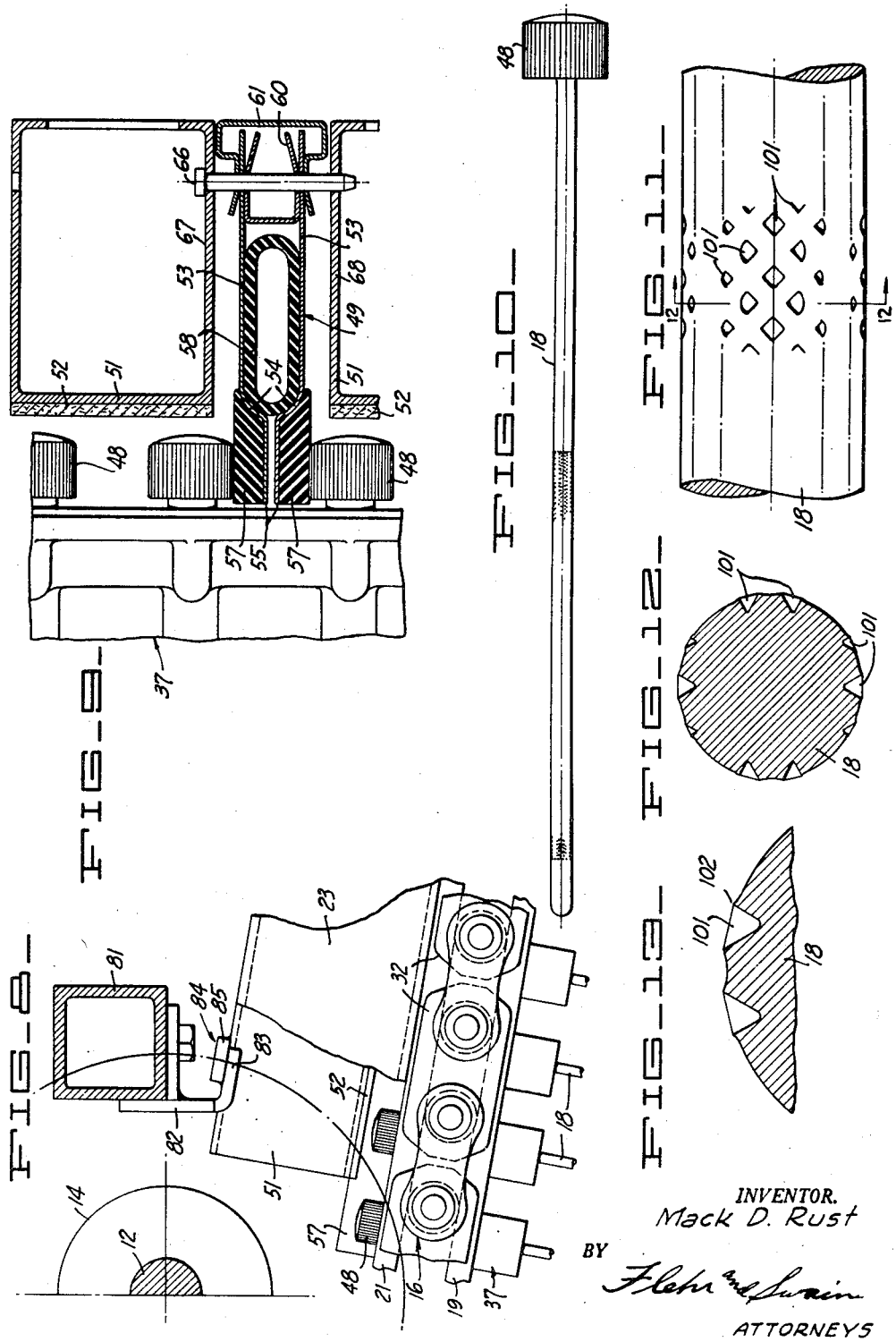

United States Patent Office 2,780,902
Patented Feb. 12, 1957

2,780,902

DRIVE MEANS FOR COTTON PICKING SPINDLES

Mack D. Rust, Coalinga, Calif.

Original application March 21, 1950, Serial No. 150,914, now Patent No. 2,699,638, dated January 18, 1955. Divided and this application September 13, 1954, Serial No. 457,004

9 Claims. (Cl. 56—42)

This invention relates generally to cotton picking machines of the type making use of a plurality of rotating spindles for the removal of cotton fiber from the plant boll. This present application is a division of my co-pending application 150,914, filed March 21, 1950, now Patent No. 2,699,638.

Conventional cotton picking machines of the rotating spindle type employ a large number of rotating spindles arranged in vertically spaced rows. The spindles are adapted to progress successively through a picking zone in which the spindles are thrust into the plants, a stripping zone in which cotton carried by the spindles is removed and a moistening zone in which moisture is applied to the spindles before returning them to the picking zone. In one type of such cotton picking machine, which can be referred to as of the Rust type (see for example Patents 1,894,198, 2,058,514, 2,085,046 and 2,466,969) the spindles are carried by endless elongated belts or chains and rotated by friction drive means. The picking spindles employed are smooth surfaced cylindrical rods of relatively small diameter. In another type which can be referred to as the International type (see Patents 2,140,631 and 2,247,686), a drum carrier is provided for the spindles, and the spindles are rotated by a positive gear drive. Relatively heavy tapered spindles are employed, which have rows of struck-out spurs or teeth to engage the fiber.

The efficiency of operation of such a cotton picking machine is determined by the amount of cotton which it will effectively pick from the plants in one pass, in proportion to the total cotton available for picking. It is obviously desirable to maintain the picking efficiency relatively high, because if a considerable amount of cotton in open bolls is left upon the plant, it may necessitate a second machine or hand picking operation. A second machine or hand picking operation greatly increases the over-all picking costs and reduces the effective daily capacity of a machine.

One problem which has been encountered with cotton picking machines employing rotating spindles, is the provision of means for effectively rotating the spindles as they progress through the picking zone. Adequate turning torque should be applied to all of the spindles and the elements of the drive means employed should be readily removable for repair or replacement. Driving means such as have been employed in the past have in many instances employed relatively expensive parts, and the parts have not been readily accessible for repair or replacement. With friction drives such as have been used in the past with machines of the Rust type, it has been difficult to provide properly equalized torque to all of the spindles being driven, and in addition it has been difficult to maintain the desired torque to all of the spindles as friction driving elements wear away. Positive drive gearing such as is employed with machines of the International type is relatively expensive to manufacture, and is difficult and expensive to service and maintain.

Another difficulty with prior art devices lies in the fact that wearing away of the friction material resulted in direct contact between the metal support for that material and the spindle rollers. It was not always possible to detect that condition and as a result serious damage often occurred before repairs could be made. By the present invention stop means are provided to prevent such damage.

It is an object of the invention to provide an improved drive means for cotton picking spindles, the parts of which are readily accessible for repair or replacement.

Another object of the invention is to provide an improved drive means which will provide uniformly adequate torque to all of the picking spindles in the picking zone, and will maintain this condition until the friction drive elements are fully worn out by usage.

Another object of the invention is to provide drive means which will prevent injury to the rollers on the ends of the spindles, and other adjacent parts of the assembly when the friction drive elements of the same have worn to a sufficient degree to require replacement.

Additional objects of the invention will appear from the following description in which the preferred embodiment of the invention has been set forth in detail in conjunction with the accompanying drawing.

Referring to the drawing:

Figure 1 is a plan view illustrating a part of a cotton picking machine, and incorporating the present invention.

Figure 2 is a cross-sectional view taken along the line 2—2 of Figure 1.

Figure 3 is an enlarged view of a portion of the device as shown in Fig. 2.

Figure 4 is a cross-sectional view taken along the line 4—4 of Figure 3.

Figure 5 is an enlarged detail view with parts broken away and shown in section illustrating suitable latch means for holding each of the backing up bars in operative position.

Figures 6 and 7 are schematic views illustrating the manner in which spindles are driven by frictional engagement with a part of the drive means.

Figure 8 is an enlarged detail view with parts broken away and shown in section illustrating suitable means for releasably holding the rear end of each of the backing bars.

Figure 9 is an enlarged view similar to Figure 3 but illustrating means for retaining the drive unit in operative position with respect to the backing bars.

Figure 10 is an enlarged plan view illustrating one of the picking spindles.

Figure 11 is an enlarged fragmentary view showing a portion of one of the picking spindles.

Figure 12 is an enlarged cross-sectional view of the picking spindle and taken along the line 12—12 of Figure 11.

Figure 13 is a further enlarged fragmentary cross-sectional view illustrating the preferred form of the indentation formed in the spindles.

Referring to Figures 1 and 2 of the drawing, I have shown a portion of a cotton picking machine of the Rust type. The parts illustrated include the machine frame 10, which is carried by suitable wheels, and which serves to support all of the working parts. Forward and rear vertical shafts 11 and 12 are journaled to the frame, and serve to mount the two pairs of chain sprockets 13 and 14. Upper and lower chains 16 and 17 engage the sprockets 13 and 14, and serve to carry the vertical rows of picking spindles 18. The upper chain 16 is shown guided between fiber strips 19 and 21, which are carried by the structural frame members 22 and 23. The lower chain 17 is similarly guided between the fiber strips 24 and 26, which are carried by the structural frame parts 27 and 28. The latter frame parts can be secured to the floor 29 of the machine. As shown in Patent 2,085,046, a plurality of fork-like plant engaging members 31 can be carried by the lower chain 17. Both the upper and lower chains are retained between the guide strips by enlarged retaining links which are designated by numbers 32 and 33 for the upper chain, and 34 and 35 for the lower chain.

The picking spindles 18 are carried by a plurality of vertically extending slats 37. Mounting hinge arms 38 and 39 are attached to the upper and lower ends of each slat, and are pivotally attached to projecting end portions of the chain pivot pins. The slats may be formed of pressed metal parts as illustrated in Figures 3 and 4. Thus in this instance two pressed metal parts 37a and 37b are secured together and serve to carry the wax impregnated wood strips 41, and the felt wiper strips 42. Holes are formed at regular vertically spaced intervals through the strips 41 and 42, to journal the spindles 18.

The picking zone or tunnel of the machine, through which the plants pass, is defined on one side by a plurality of longitudinally extending fins 43, which are spaced apart vertically, and which are carried by the depending frame parts 44. The other side of the tunnel is defined by the members 46 (Figures 1, 2 and 3) which extend between the paths of movement of the spindles 18, and which are secured at their ends to the main machine frame. As illustrated in Figures 1 and 2 the spindles 18 are of sufficient length to extend to a point between the fins 43. The spindles 18 are of special construction as will be presently described.

Special drive means is employed for rotating the spindles as they pass through the picking zone. Referring particularly to Figures 3 and 4, a drive roller 48 is secured to the end of each spindle, and its peripheral surface is fluted or knurled as illustrated. A special friction drive unit 49 cooperates with two adjacent rows of spindles to drive the same with sufficient torque to accomplish the desired picking operation. The driving units are disposed between the vertically spaced backing bars or members 51, which are preferably fabricated from sheet metal to be rectangular in cross-sectional contour as illustrated in Figure 3. The outer wall of each backing bar 51 is provided with a fiber surfacing 52, which may engage the end faces of the adjacent rollers 48, to thereby prevent displacement of the spindles with respect to the slats 37. As will be presently explained the backing bars 51 are removably secured at their ends to the frame of the machine.

Each of the drive units 49 consists of pressed metal side members 53, which are offset toward each other at 54, and which provide extension portions 55 disposed between adjacent rows of rollers 48. Preferably the plates are provided with slots 56 as illustrated in Figure 4 and which extend through portions 54 and 55. Such slots provide spring fingers which facilitate uniform driving action upon all of the engaged rollers as will be presently described. Strips 57 of rubber or other suitable resilient material are secured to the portions 54 and 55 (i. e. the fingers formed by the same) by vulcanizing or bonding thereto. These strips extend for the length of the picking zone, and their end portions 57a can be tapered as illustrated in Figure 7, to effect gradual driving engagement between the rollers and the faces of the strips. Enclosed between the members 53, and offset laterally from the drive strips 57, there is a tube 58 of rubber or like resilient material, which is adapted to be inflated by pneumatic pressure.

The inner edges of the members 53 are apertured to loosely accommodate the pins 59. These pins also extend through the spacer members 60 and the branches of the U-shaped pressed metal member 61, the latter forming a mounting member extending the length of the drive unit.

At the end of each drive unit there is a tube 62 (Figure 1) which connects with the inflatable rubber tube 58, and these tubes all connect with the common manifold 63. An air supply pipe 64 connects with the manifold 63, and extends to a source of air under pressure, through a suitable control valve.

The drive units 49 can be generally held in place between the backing bars 51 by means such as illustrated in Figures 5 and 9. Thus near the forward and rear ends of the drive units, longer retaining pins 66 are provided which extend through the adjacent horizontal walls 67 and 68 of the backing bars 51. Thus the pins 66 serve to hold the drive units in operative position, and by the removal of these pins, the drive units can be removed in entirety.

It is desirable to provide for ready removal of the backing bars 51. Thus a plurality of vertically extending structural members 71 are provided, which have their ends removably attached to the structural frame parts 23 and 28 (Figure 2). Each of these structural members is provided with studs 72 which are removably accommodated in apertures 73 provided in the backing bars 51. The structural members 71, together with the studs 72 therefore serve as means for generally retaining the backing bars 51 in place, and with proper vertical spacing between the same. However structure members 71 can be readily removed, to facilitate removal of the backing bars. The forward end of each of the backing bars is retained in place by latch means such as shown in Figure 5. Thus a web 74 is attached to the forward end of each of the bars 51, and serves to carry a pivoted latch 76. This latch is urged by spring 77 into engagement with the latch aperture 78, which is formed in the vertical frame member 79. By manually retracting the latch 76, the corresponding backing bar 51 can be swung away from the spindles and removed from the machine frame.

The rear end of each backing bar is provided with locking means, which permits ready removal of the bars after the latches 76 have been released. Thus as shown in Figure 8 a vertical frame member 81 is provided with a bracket 82 which is slotted to form a plurality of vertically spaced fingers 83. The fingers 83 are dimensioned to fit between the backing bars. Each backing bar carries a plate 84 which forms tabs 85 adapted to engage behind two adjacent fingers 83, when the parts are properly positioned and the backing bar is moved to the left to locked position, as viewed in Figure 8. It will be evident that when the other end of the backing bar is released and swung outwardly a short distance, then the bar can be moved forwardly of the machine to disengage tabs 85 from the associated fingers 83.

Operation of the drive means described above is as follows: When the machine is in operation air at a suitable selected pressure is supplied to the inflatable tubes 58, and the expansion of these tubes urges the friction drive strips 57 into frictional engagement with the spindle rollers 48. Pressure is evenly distributed throughout the length of the drive unit, whereby a predetermined torque is available for each of the spindles. Generally the slats hold the spindles to extend at an angle slightly off 90° with respect to the strips 57, so that a force component is developed longitudinally of each spindle, tending to hold the same in operative position within the associated slat. However the spindles cannot be displaced to any extent from the slats, because the rollers 48 engage the surfacing 52 of the backing bars.

In time the strips 57 will wear and become thinner. The lowermost unit 49 of Figure 3 shows strips 57 which have become worn. Generally a worn strip will have a thin portion 57b, which directly engages the periphery of the spindle knob, and a thicker portion 57c which has not been worn away to any extent. When substantially all of the thinner portion 57b has been worn away, the thicker portions 57c engage the adjacent shoulders 86, thus limiting further expansion to thereby avoid pressing metal parts directly into engagement with the rollers 48.

In operation the drive units 49 accommodate themselves to slight inaccuracies in manufacture and assembly, and this is permitted by flexing the members 53, by the general looseness of the mounting members 61 between the backing bars 51 and in the attachment to the members 53. In addition members 53 in effect may pivot about the pin 59, due to the relatively loose connection between these parts. Adequate driving torque is applied to each of the spindles in the picking zone throughout the useful life of the friction drive strips 57. As a strip 57 wears away and becomes thinner, the same pressure continues to be applied between the strip and each of the rollers 48. This is because the inflatable tube 58 does not act like a mechanical spring, which has a definite spring rate, but on the contrary applies forces to the strips 57 dependent upon the pneumatic pressure with which the tube is inflated.

When strips 57 have become worn, it is a relatively simple matter to remove that particular drive unit, and then either install a new unit, or repair the worn strips.

My preferred spindle construction (claimed in said application 150,914) is illustrated particularly in Figures 10 to 13 inclusive. As is customary in cotton picking machines of the Rust type, I employ a spindle in the form of a rod which is circular in cross-section and which is of constant diameter. It should be formed of relatively hard metal such as a suitable hard alloy steel. Special indentations are provided in its peripheral surface as illustrated particularly in Figures 11 to 13 inclusive. These indentations, designated individually by number 101, are preferably each in the form of an inverted pyramid, and are formed by application of a suitable indenting tool, provided with pyramid-shaped indenting studs. In forming these indentations a slightly raised edge 102 is formed about each indentation, as illustrated in Figure 13, due to deformation of the adjacent metal. In actual practice I have used indentations averaging about 0.015 inch in depth, and about 0.015 inch in width at the surface of the spindle, with a spindle measuring 0.162 inch in diameter.

While it is possible to extend the indentations over the entire surface of the spindles, I prefer to provide the indentations in spaced rows substantially as illustrated in Figures 11 and 12. Thus in this instance four circumferentially spaced rows of indentations are provided. Such spaced rows can be easily and cheaply applied during manufacture.

While I prefer to have the indentations in the form of square or diamond based pyramids it is possible to employ any pyramidal or similar shape.

I claim:

1. In a cotton picking unit having a plurality of picking spindles having drive rollers thereon, driving means for said spindles including; a support, a pair of thin resilient plates, said plates each being loosely connected at one edge to said support, resilient frictional drive rails secured to each of said plates along its other edge for frictionally engaging said drive rollers and rotating said rollers and spindles, expanding means between said plates, said expanding means being positioned between said drive rails and said support for urging said drive rails into frictional driving engagement with said rollers.

2. A cotton picking unit as defined in claim 1 wherein said expanding means comprises a pneumatically expansible tubular element.

3. In a cotton picking unit having a plurality of cotton picking spindles having drive rollers thereon, driving means for said spindles including; a support, a pair of relatively thin superposed resilient plates spaced apart vertically and each being loosely connected at one side edge thereof to said support, said plates being provided with portions offset toward each other at the opposite edges thereof, resilient frictional drive rails secured to said offset portions of said plates and disposed for contact with said rollers on said spindles, tubular pneumatic pressure means between said plates and disposed in a position between said offset portions and said support for urging said drive rails into frictional driving engagement with said rollers.

4. In a cotton picking unit having a plurality of picking spindles having drive rollers thereon, driving means for said spindles including; a support, a pair of thin resilient plates, said plates each being loosely connected at one edge to said support, resilient frictional drive rails secured to each of said plates along its other edge for frictionally engaging said drive rollers and rotating said rollers and spindles, expanding means between said plates, and stationary means adjacent said plates positioned to limit the movement of the drive rails toward the rollers to a predetermined position whereby to prevent direct contact between said plates and rollers when said resilient drive rails wear away.

5. In a cotton picking unit having a plurality of cotton picking spindles having drive rollers thereon, driving means for said spindles including; a support, a pair of thin superposed resilient plates spaced apart vertically and loosely connected at one edge thereof to said support, said plates being provided with portions offset towards each other along the other edges thereof, resilient frictional drive rails secured to said offset portions of said plates and disposed for frictional driving contact with said rollers, tubular pneumatic pressure means between said plates and disposed between said drive rails and said support for urging said drive rails apart and into frictional driving engagement with said rollers, and stationary means adjacent said plates positioned to limit the movement of the drive rails toward the rollers to a predetermined position whereby to prevent direct contact between said plates and rollers when said resilient drive rails wear away.

6. In a cotton picking unit having a plurality of cotton picking spindles having drive rollers thereon and a set of backing bars therefor, driving means for said spindles including; a support, a pair of thin superposed resilient plates spaced apart vertically and loosely connected at one edge thereof to said support, said plates being provided with portions offset toward each other at the other edges thereof, resilient frictional drive rails secured to said offset portions of said plates and disposed for contact with said rollers, tubular pneumatic pressure means between said plates and disposed between said drive rails and support for urging said drive rails apart and into frictional driving engagement with said rollers, said backing bars having portions in close proximity to said drive rails to serve as stop means for limiting the movement of the drive rails toward the rollers to a predetermined position whereby to prevent direct contact between said plates and rollers when said resilient drive rails wear away.

7. In a cotton picking unit having a plurality of cotton picking spindles having drive rollers thereon, driving means for said spindles including; a support, a pair of this superposed resilient plates spaced apart vertically and loosely connected at one edge thereof to said support, said plates being provided with portions offset towards each other along the other edges thereof, resilient frictional drive rails secured to said offset portions of said plates and disposed for frictional driving contact with said rollers, pressure means between said plates and disposed between said drive rails and said support for urging said drive rails apart and into frictional driving engagement with said rollers, and stationary means positioned to limit the movement of the drive rails toward the rollers to a predetermined position whereby to prevent direct contact between said plates and rollers when said resilient drive rails wear away.

8. Spindle drive means including a mounting member, a pair of superposed resilient plates spaced apart vertically and loosely connected along one edge to the mounting member, said plates having portions along an opposed edge thereof offset toward each other, resilient frictional spindle drive rails secured to the offset portions of said plates, a spacing member interposed between said plates at the connections thereof with said mounting member, pneumatic means being between said plates and between said spacing member at one side and said offset portions of said plates at the other side.

9. The spindle drive means of claim 6 including stationary means adjacent said drive rails positioned to limit the outward movement of the drive rails to a predetermined position.

References Cited in the file of this patent

UNITED STATES PATENTS

| | | |
|---|---|---|
| 2,058,514 | Rust et al. | Oct. 27, 1936 |
| 2,440,450 | Rust | Apr. 27, 1948 |
| 2,548,069 | Rust | Apr. 10, 1951 |
| 2,665,536 | Rust | Jan. 12, 1954 |
| 2,671,298 | Fergason | Mar. 9, 1954 |